United States Patent [19]

Stephany

[11] Patent Number: 5,331,140
[45] Date of Patent: Jul. 19, 1994

[54] CODE READING SYSTEMS

[75] Inventor: Joseph F. Stephany, Williamson, N.Y.

[73] Assignee: Xerox Corporation, Stamford, Conn.

[21] Appl. No.: 862,029

[22] Filed: Apr. 2, 1992

[51] Int. Cl.⁵ ............................................. G06K 7/10
[52] U.S. Cl. .................................. 235/462; 235/468; 235/491
[58] Field of Search .................... 235/462, 468, 491

[56] References Cited

U.S. PATENT DOCUMENTS

| | | | |
|---|---|---|---|
| 4,240,064 | 12/1980 | Choudhury | 235/462 |
| 4,494,865 | 1/1985 | Andrus et al. | |
| 4,694,182 | 9/1987 | Howard | 235/462 |
| 4,716,438 | 12/1987 | Farrell | |
| 4,757,348 | 7/1988 | Rourke et al. | |
| 4,777,510 | 10/1988 | Russel | |
| 4,786,798 | 11/1988 | Lonsdale | 235/472 |
| 4,834,360 | 5/1989 | Acquaviva | |
| 4,862,217 | 8/1989 | Russel | |
| 4,916,297 | 4/1990 | Tukada et al. | 235/472 |
| 4,983,817 | 1/1991 | Dolash et al. | |
| 5,068,520 | 11/1991 | Sato | 235/472 |
| 5,093,147 | 3/1992 | Andrus et al. | |
| 5,140,146 | 8/1992 | Mettitsky et al. | 235/462 |
| 5,202,784 | 4/1993 | Reddersen | 235/472 |
| 5,210,397 | 5/1993 | Eastman | 235/462 |
| 5,210,411 | 5/1993 | Oshima et al. | 235/491 |

FOREIGN PATENT DOCUMENTS 0015479 1/1988 Japan .................. 235/491

OTHER PUBLICATIONS

J. F. Stephany, Piezo-Optic Resonances in Crystals of the Dihydrogen Phosphate Type, Reprinted from Journal of the Optical Societ of America, vol. 55, No. 2, 136-142, Feb. 1965.

C. L. Stong, The Amateur Scientist, Reprinted from Scientific American, Jul. 1962.

T. M. Dolash et al., Novel Bar Coding System for Non-letter Mail, Presented at Third Advanced Technology Conference, May 1988.

J. J. Garvey et al., An "Invisible" Bar Code, Information from Battelle, Dec. 1990.

W. G. Elwin, Coding Documents With Adjustable Copier Parameters, Kodak Research Disclosure No. 18348, Jul. 1979.

Primary Examiner—Tony M. Argenbright
Assistant Examiner—Erick Solis
Attorney, Agent, or Firm—Oliff & Berridge

[57] ABSTRACT

Bar code reading systems having enhanced detection capabilities are disclosed. The systems are particularly useful for invisible bar codes. The bar code is irradiated with radiation that is sine wave or square wave modulated at one or more frequencies. A detector is sensitive to a frequency related to the modulation frequencies, preferable to a sum or a difference of at least two modulating frequencies, produced by intermodulation of the modulating frequencies. Such intermodulation can result from the non-linear fluorescing characteristics of dyes incorporated into the bar code markings. The modulation can also be sinusoid or square wave at a single frequency. Detection of coded information on sheets containing whiteners or other dyes capable of fluorescing in response to the radiation utilized by the code reader is improved by employing radiation absorbing components in the code markings.

33 Claims, 4 Drawing Sheets

CODE READING SYSTEMS

BACKGROUND OF THE INVENTION

1. Field of the Invention

This invention relates to the application of coded information to objects, which coded information is subsequently electronically read. The invention relates to coding systems not visible to the human eye, which are particularly useful in reprographic machines, printers and other document handling equipment.

2. Related Developments

Bar code reading systems in which bar codes on an object are invisible to the human eye but can be read electronically have a wide area of application. Such systems may be used in office document duplicators to code documents for security purposes to prevent unauthorized copies from being made. These coding systems may also be used to code documents for the control of various operations within the duplicator, such as sorting and paper path selection, as described in U.S. Pat. Nos. 4,716,438 and 4,757,348, the disclosures of which are incorporated herein by reference. Information necessary to provide color correction, enhancement and translation, document identification, image preservation, and document control and security can also be provided in taggants that are incorporated into marking materials used to create images or codes, as described in U.S. Pat. No. 5,225,900 (the disclosure of which is incorporated herein by reference), assigned to the assignee of the present invention.

Invisible bar codes systems also find use on commercial product labeling. For this use, the invisible bar code system has several principal advantages over visible bar code systems. The product can have a bar code placed on all sides of the package, thereby increasing the convenience of entering the bar code into a bar code reader without reorienting the package. Invisible bar codes do not detract from the appearance of consumer products, such as perfumes or magazines. Additional bar code information can be placed on the product, such as expiration dating and additional manufacturers' identification number, which are not evident to the purchaser or user without special decoding equipment. Invisible bar codes can be used to mark mail without obliterating markings that are already present.

Invisible bar codes systems utilizing ultraviolet (UV) stimulated visible fluorescent dyes in the bar code have been proposed. However, these systems have two principal difficulties. UV light used to stimulate the fluorescent dyes of the bar codes also stimulates fluorescence of paper whiteners commonly used in paper stock, thereby making readout difficult. If the bar code is placed over underlaying print, the signal is deteriorated because printing inks tend to absorb the incident and fluorescent radiation, thereby rendering detection even more difficult. Further, inexpensive, compact and concentrated UV light sources are not readily commercially available.

Systems for overcoming the disadvantages of UV stimulated invisible bar codes have involved the use of infrared (IR) fluorescent bar codes that are stimulated in the visible or near IR spectrum and fluoresce at longer wavelengths in the IR spectrum. Such systems are described in the paper, *A Novel Bar Coding System for Non Letter Mail* by T. Dolash, P. Andrus and L. Stockum, presented at the 3rd Advanced Technology Conference, Washington, D.C., May 3–5, 1988, in U.S. Pat. No. 4,983,817 and in U.S. Pat. No. 5,093,147. In these systems, a bar code containing an IR fluorescent dye is scanned with stimulating radiation from a red helium-neon laser or a gallium-aluminum-arsenide laser to activate the IR fluorescence of the dye. This signal is then detected with an IR photodiode. These systems have advantages over those utilizing UV activation because there are no known paper whiteners or inks that fluorescence in the infrared spectrum. Thus, when IR fluorescent dyes are used, the detected signal only comes from inks intentionally put down and not from any inks or paper whiteners that are present in the paper. However, a disadvantage of these systems is that the amount of fluorescent IR light received from the dye is strongly influenced by the absorption of radiation by ink or other coloring material under the dye, which modifies the reflectivity of the surface and thus the amount of IR light detected by the photodiode.

In order to overcome this problem, a relatively complicated detection system has been proposed in which both stimulating laser radiation and IR fluorescent radiation are detected by two photodiodes, with appropriate optical filters over each diode to detect either the laser radiation or the fluorescent radiation. The outputs of the photodiode are processed in a ratio circuit to give a reliable signal that this corrected for variations in reflectivity caused by printing. The system in essence cancels any variation in reflectivity. However, the relationship between the incident laser light intensity and the intensity of the IR fluorescent light is not linear. Thus, when a ratio is taken, the measured ratio varies with the amount of light absorption by any ink under the dye. As a consequence, a complex electronic circuit must be used to give an artificial non-linear relationship between the input from the incident light photo cell and the input to the ratio determining circuit, to make the incident light response as non-linear as the IR fluorescent response. This is necessary to make the output respond linearly to the IR dye, despite variations in absorption resulting from underlying ink. However, this method is excessively complex and difficult to adjust. Moreover, the foregoing system is subject to interference from background illumination.

Systems for coding transparent receiver sheets for subsequent machine decoding have also been proposed. In commonly assigned U.S. Pat. No. 5,146,087, the disclosure of which is incorporated herein by reference, an imaging process utilizing invisible IR absorbing marking materials to form bar codes is disclosed. Because a transparent receiver sheet is used, the problem of a low contrast ratio resulting from the use of fluorescent compounds in the sheet does not arise.

SUMMARY OF THE INVENTION

It is an object of the invention to provide improved bar code systems.

It is another object of the invention to provide invisible bar code reading systems that are reliable and low cost.

It is a further object of the invention to provide invisible bar code systems that are highly immune to the influences of underlying printing.

It is a further object of the invention to provide invisible bar code reading systems that are immune to the effects of fluorescent compounds in common paper stocks.

It is a further object of the invention to provide a code reading system that is compact and can be easily incorporated into reprographic equipment.

In one aspect of the invention, these objects are achieved by the use of methods and apparatus that employ a radiation source modulated at two frequencies that are not harmonically related, directing the modulated radiation at a code marking that has a non-linear response, resulting in the intermodulation of the radiation to produce sum and difference frequencies, and detecting the sum or difference frequencies to provide an output signal indicative of the coded information.

In another aspect of the invention, a marking code is laid down with a substance which absorbs incident radiant energy that causes fluorescence of unmarked portions of the surface on which the radiant energy is incident. Coded information is read by detecting fluorescence from portions of the code where the light absorbing material is absent.

In another aspect of the invention a compact reading assembly employs an element, such as a half-silvered prism, for directing radiation onto a coded surface along a first path. The same element directs radiation received from the coded information along a second path for detection by a radiation detector.

DESCRIPTION OF THE PREFERRED EMBODIMENTS

Figure 1:
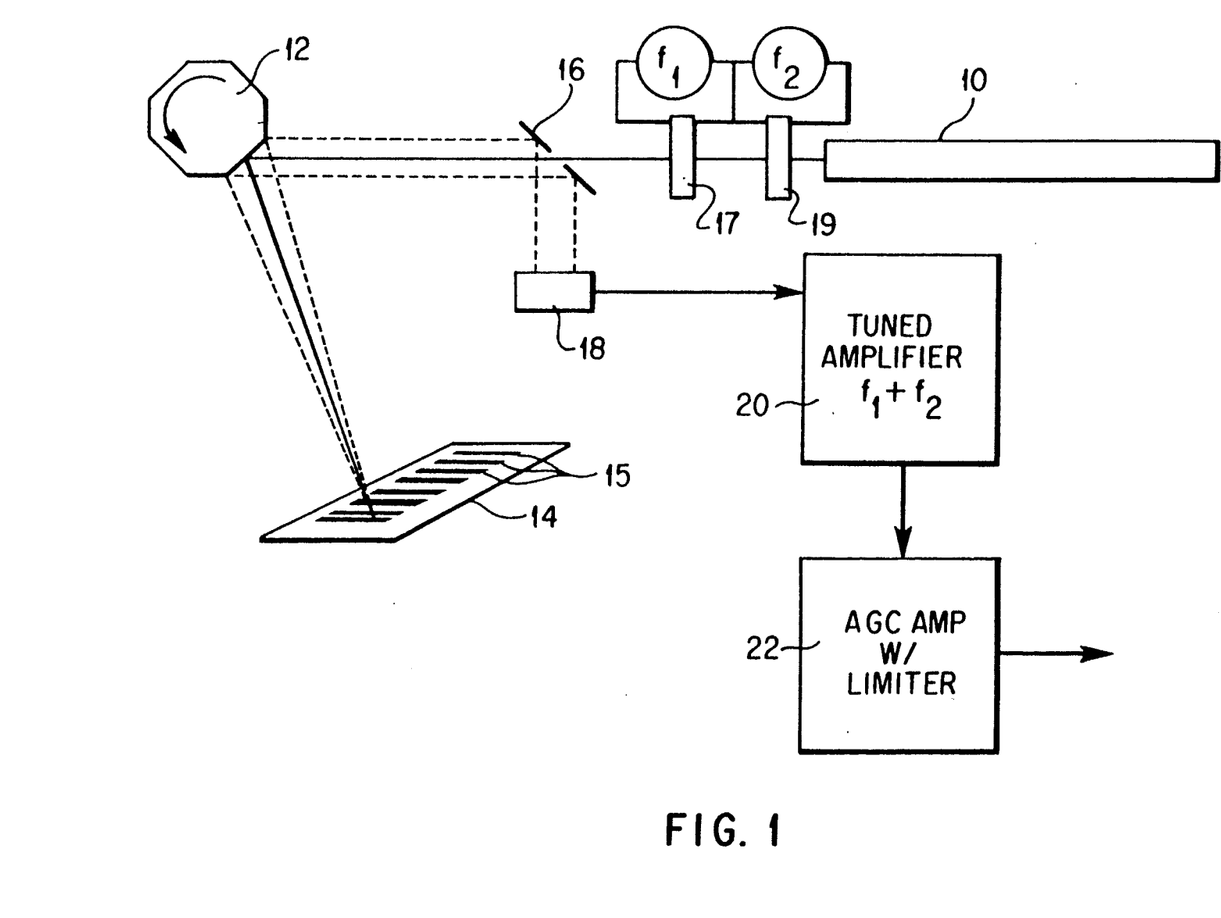
FIG. 1 is a schematic illustration of one embodiment of a bar code reading system in which incident radiation is sinusoidally modulated.

In FIG. 1, a bar code reading system is shown that embodies aspects of the invention. In this system, a radiation source 10 projects a beam of light onto a rotating polygonal scanning mirror 12, which causes the beam to scan along bar code 14. A holographic scanner or scanning by movement of a document on which the bar code is disposed can also be used. The radiation source 10 produces a beam of radiation at a wavelength capable of exciting fluorescence of either the materials, such as a dye, laid down to form the bar code 14 or fluorescent materials contained in the surface of the object on which the bar code 14 is applied. In this embodiment, the light source 10 can comprise a helium-neon laser capable of providing light at visible and near infrared wavelengths or a gallium-aluminum-arsenide laser diode that emits radiation centered about near infrared wavelengths of 780 to 800 nanometers.

The bar code 14 can be formed by a marking material jetted onto an appropriate receiving surface. The marking material preferably includes a dye that absorbs infrared radiation at infrared wavelengths (for example, 800 nm to about 1500 nm), that exhibit little or no reflection of visible light and that have a non-linear fluorescent response to stimulating radiation. The following dyes are useful for this purpose:

| Chemical Names and Structural Formulas of the Dyes | | |
|---|---|---|
| CAS Registry No | | |
| 301-70-3 | DTTCI | (3,3'-Diethylthiatricarbocyanine Iodide) |
| | DNTTCI | (3,3'-Diethyl-9,11-neopentylenethiatricarbocyanine Iodide) |
| 3599-32-4 | IR-125 | IH-Benz[e]indolium,2-[7-[1,3-dihydro-1,1-dimethyl-3-(4-sulfobutyl)-2H-benz[e]indol-2-ylidene]-1,3,5-hepatrienyl]-1,1-dimethyl-3-(4-sulfobutyl-,sodium salt |
| | DDTTCI | (3,3'-Diethyl-4,4',5,5'-dibezothiatricarbocyanine Iodide) (Hexadibenzocyane 45) |
| 22268-66-2 | DTTC Perchlorate | Benzothiazolium,3-ethyl-2-[7-(3- = ethyl-2(3H)-benzothiazolylidene)-1,3,5- = heptatrienyl]-,perchlorate |
| 23178-67-8 | HDITCI | (1,1',3,3,3',3'-Hexamethyl-4,4',5,5'-dibenzo-2,2'-indotricarbocyanine Iodide) |
| 53655-17-7 | IR-140 | Benzothiazolium,5-chloro-2[2-[3-[5-chloro-3-ethyl-2(3H)-benzoethiazolylidene-ethylidene]-2-(diphenylamino)-1-cyclopenten-1-yl]ethyl-3-ethyl-,perchlorate. |
| | DDCI-4 | (1,1'-Diethyl-4,4' dicarbocyanine Iodide) |
| 54849-69-3 | IR-144 | 1H-Benz[e]indolium,2-[2-[3-1,3-dihydro-1,1-dimethyl-3-(3- = sulfopropyl)-2H-benz[e]indol-2-ylidene] = ethylidene]-2-[4-(ethoxycarbonyl)-1-piperaziny = 1]-1-cyclopenten-1-yl]ethenyl]-1,1-dimethyl-3- = (3-sulfopropyl)-,hydroxide,inner salt, compound with N,N-diethylethanamine |
| 62669-62-9 | IR-132 | Naphtho[2,3-d]thiazolium,2-[2-[2-(diphenylamino)-3-[[3(4-methoxy-4-oxobutyl)naptho[d]thiazol-2(3H)-ylidene-ethylidene]-1-cyclopenten-1-yl]ethenyl]3-(4-methoxy-oxobutyl)-, perchlorate |

As illustrated by the dotted lines in FIG. 1, fluorescent radiation emitted from the printed bars 15 of the bar code 14 in response to incident radiation from source 10 is received onto the surface of mirror 12 and reflected to a mirror with hole 16 (with an opening for passage of the laser beam), that deflects the fluorescent radiation onto an IR photodetector 18.

An important aspect of this design is that the beam of radiation from source 10 is modulated, prior to impingement of bar code 14, by a first modulator 17 and a second modulator 19 that modulate the beam at frequencies $f_1$ and $f_2$, respectively, that are not harmonics one of the other. For this purpose, electro-acoustic modulators which sinusoidally modulate the beam can be utilized. Such modulators are disclosed in *Piezo-Optic Resonances in Crystals of Dihydrogen Phosphate-Type*, J.F. Stephany, J. Opt. Soc. Am., Vol. 55, pp. 136–142 (February, 1965) and *How An Electric Field Can Modulate Light By Changing The Refractivity Of A Crystal*, J.F. Stephany and H. Jaffe, Scientific American Vol. 206 page 166 (July, 1962), the disclosures of which are incorporated herein by reference. Such modulators employ the mechanical resonance of a crystal, for example a dihydrogen phosphate crystal, to enable high degrees of sinusoidal modulation without expensive drivers. The cited articles discuss the technical basis of such modulators and provide details for the construction of them. Therefore, no further detailed explanation is necessary.

When the modulated beam impinges on the bar code 14, the dye incorporated into the ink forming bars 15 has a non-linear fluorescent response and this non-linearity causes the two frequencies $f_1$ and $f_2$ to mix or heterodyne (intermodulate), yielding a sum and a difference frequency component, $(f_1+f_2)$ and $(f_1-f_2)$, respectively. This phenomenon is well known at radio frequencies and is illustrated by the following derivation. If the incident beam of radiation is modulated at two frequencies, $\omega_1$ and $\omega_2$, then the light intensity $l_i$ after passing through the two modulators 17, 19 is:

$$l_i = 1 + (\tfrac{1}{2})\sin(\omega_1 t) + (\tfrac{1}{2})\sin(\omega_2 t). \quad (1)$$

If it is assumed that the relationship between the intensity of the reflected beam resulting from fluorescence, $l_r$ is non-linear, the relationship can be defined as follows:

$$l_r = al_i + bl_i^2. \quad (2)$$

then, substituting Eq. (1) and Eq. (2), the reflected light intensity can be described by the following:

$$l_r = a + 5b/4 + (a+b)\sin(\omega_1 t) + (a+b)\sin(\omega_2 t) - (b/8)\cos 2(\omega_1 t) - (b/8)\cos(\omega_2 t) + (b/4)\cos(\omega_1 - \omega_2)t - (b/4)\cos(\omega_1 + \omega_2)t. \quad (3)$$

This shows the creation of the sum $(\omega_1+\omega_2)$ and the difference $((\omega_1-\omega_2)$ frequencies in the last two terms of Eq. (3). A preferred range for modulation frequencies $f_1$ and $f_2$ is between about 1 KHz to about 50 KHz.

The modulated incident laser beam is therefore modulated at frequencies $f_1$ and $f_2$, while the IR fluorescent light returning to the photoreceptor 18 is modulated by frequencies $f_1$ and $f_2$, as well as frequencies $(f_1+f_2)$ and $(f_1-f_2)$. The output of the photoreceptor 18 is supplied to a tuned amplifier 20 that is responsive to either of frequencies $(f_1+f_2)$ or $(f_1-f_2)$. The output of the amplifier 20 is a signal that reproduces the bar code 14. This signal is supplied to an automatic gain control amplifier with limiter 22 that puts the signal at a constant level for digitization so that it can supplied to a digital computer, even though the signal will fluctuate an amplitude according to the IR absorption of the ink and/or paper bar code 14. Because the system offers a high degree of rejection of signals from background light, the gain of amplifier 20 can be high so that the IR fluorescent signal will always be above some minimal level which, in turn, can be greater than any noise present. Therefore, there will always be a reliable output signal representative of the bar code, no matter how much radiation is absorbed by the ink or paper underlying the dye in the bar code.

Figure 2:
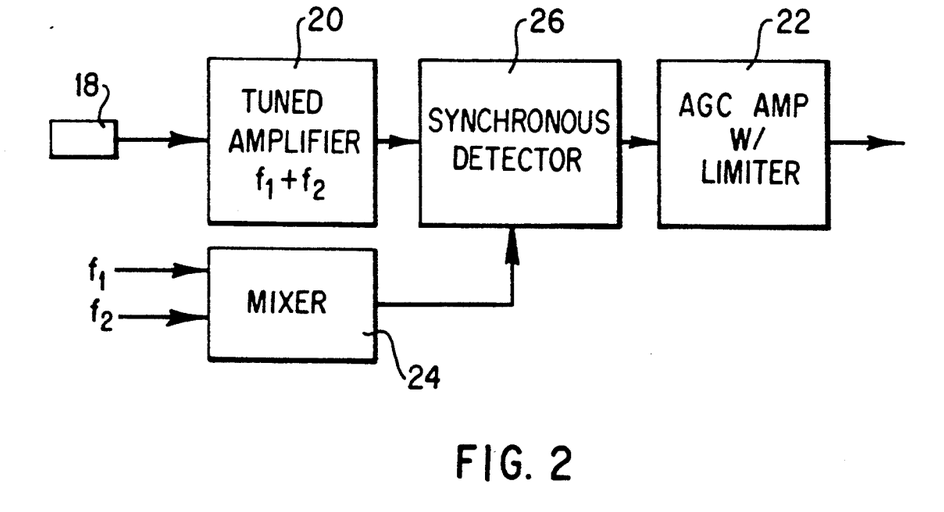
FIG. 2 illustrates a system as in FIG. 1 wherein a synchronous detector is used.

Referring to FIG. 2, additional noise rejection in the output from photoreceptor 18 can be achieved by using a synchronous detector 26 interposed between amplifier 20 and AGC amplifier 22 to receive the output signal from amplifier 20. The synchronous detector provides an output only in response to a received signal that is in phase with a reference signal. As shown in FIG. 2, the reference signal can be provided by a mixer 24 that sums (or substracts) the frequencies $f_1$ and $f_2$ to form a reference signal. An advantage of this system is that the mixing can occur at low signal levels so that leakage of the sum (or difference) frequency into the tuned amplifier 22 is avoided. Such synchronous detection techniques are well known in radio signal processing and no further detailed explanation is necessary.

One variation of the systems described with respect to FIGS. 1 and 2 is to employ a sinusoidal modulator at a representative frequency $f_1$. The non-linearity of the dye forming the bar code 14 generates a second harmonic, $2f_1$ in the detected fluorescent beam. While such a system avoids the need for a second modulator, it has the disadvantage that there has to be extensive isolation of the driver electronics for the modulator so that the harmonics of the electronic driver do not interfere with the signal. Also, such a system would not exhibit as high a level of sensitivity as the systems illustrated in FIGS. 1 and 2.

Figure 3:
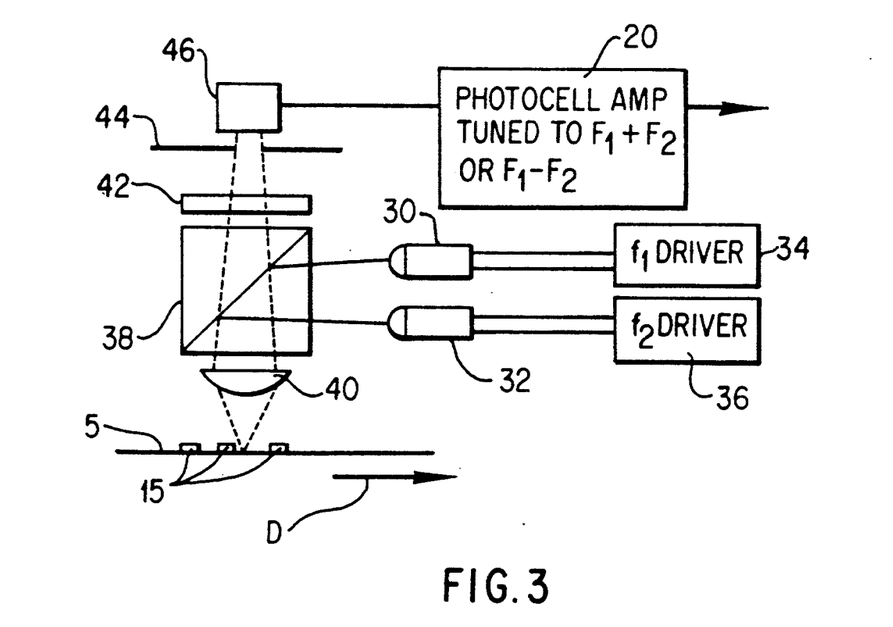
FIG. 3 schematically illustrates another embodiment of bar code reading system wherein incident radiation is square wave modulated.

Referring to FIG. 3, another embodiment of bar code reading system in accordance with the invention is shown. In this system, two radiation sources 30 and 32, are utilized. For an invisible bar code system, the sources emit radiation at wavelengths primarily outside the visible spectrum. Thus, the radiation sources 30 and 32 can comprise IR laser diodes or IR light emitting diodes (LEDs). For example, laser diodes are commercially available that emit radiation at wavelengths of 750, 780, 810 and 830 nanometers, namely in the near IR portion of the spectrum. Each of the sources 30, 32 is driven by a separate driver element 34, 36 respectively. Driver 34 drives radiation source 30 at a first frequency $f_1$ and driver 36 drives radiation source 32 at a second frequency $f_2$, which is not harmonically related to frequency $f_1$. In this embodiment, the drivers 34 and 36 drive the sources 30, 32 with square wave energization signals. The square wave modulated beams from radiation sources 30, 32 are directed in a first direction toward an optical element, such as a half-silvered prism 38, which deflects the beam along a second direction transverse to the first direction, through a converging lens 40 to be focused on a sheet 5 moving in the direction of the solid arrow. The sheet 5 can comprise a sheet of paper to be imaged or otherwise processed and is movable along a feed path in the direction of the arrow D. The beams are incident on successive elements 15 of a bar code that are deposited on a surface of the sheet S. The elements or bars 15 comprise an ink that includes a dye which fluoresces in the IR range. Dyes which can be used are the same type as those previously described in connection with FIG. 1 and have a non-linear fluorescent response to incident radiation.

From Fourier analysis, it is known that the square wave modulated combined beam contains, as components, sinusoidal waves at frequencies $f_1$ and $f_2$. The beam modulated with these components is incident on the fluorescent ink forming the bars 15 and stimulates fluorescence. As described above, because of the non-linear response of the fluorescent light to the stimulated light, the fluorescent light includes sum and difference components $(f_1+f_2)$ and $(f_1-f_2)$. The fluorescent beam is reflected upwardly through lens 40 and through half-silvered prism 38 in a direction parallel to the second direction of the incident beams to a filter 42, which filters out radiation outside the range of that emitted by radiation sources 30, 32. The filtered beam is focused by a slit in slit plate 44 onto an infrared photoreceptor 46. The light reaching photoreceptor 46 includes components modulated at frequencies $f_1$ and $f_2$ and harmonics of $f_1$ and $f_2$ and also harmonics of $(f_1+f_2)$ and $(f_1-f_2)$. However, as in the FIG. 1 embodiment, these components are eliminated by the tuned amplifier 20 that amplifies only that portion of the signal modulated at one of the sum or difference frequencies of $f_1$ and $f_2$. This technique is similar to that used in amplitude modulated broadcast transmitters that use pulse width modulation, and thus is a known signal processing technique.

The reader arrangement comprising the half-silvered prism 38, lens 40, filter 42, slit plate 44 and photoreceptor 46 can also be used in the embodiment shown in FIG. 1. By use of the prism 38, the assembly can be made compact to fit within imaging terminals of reprographic equipment.

In the foregoing description, it can be seen that two laser diodes or LEDs 30, 32 can produce unmixed modulated IR radiation which is mixed by the non-linear fluorescent (or phosphorescent) response of the bar diode dye and that this results in a signal proprotional to incident light intensity and bar code dye density. The system shown in FIG. 3 provides advantages over the FIG. 1 system. The system shown in FIG. 3 is more compact because it does not require the acousto-optical resonance modulators. System cost is reduced by replacing the sign wave modulators with square wave drivers. In addition, stability of the system is enhanced because the radiation emitting laser diodes 30, 32 are only required to be stable at two operating points corresponding to the current levels produced by the square wave drivers. As a consequence, variations in the response of the diodes are significantly minimized.

Figure 4:
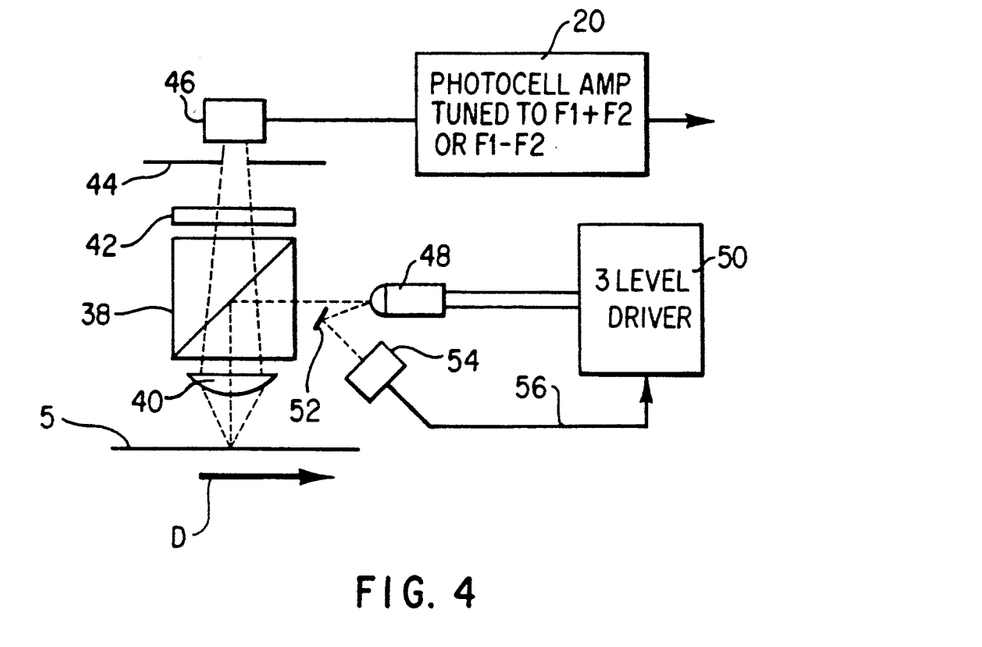
FIG. 4 schematically illustrates a second embodiment of the system illustrated in FIG. 3, employing a single radiation emitting element.

FIG. 4 illustrates a bar code reading system similar to that shown in FIG. 3 but having only a single IR laser diode or IR LED as a radiation source 48. In this arrangement, the source 48 is driven by a three level driver 50 to drive the source 48 with the square wave signals at a first frequency $f_1$ and a second frequency $f_2$. Preferably, the driver 50 is a constant current type driver so that radiation intensity produced by the laser diode is proportional to the applied current.

Figure 5:
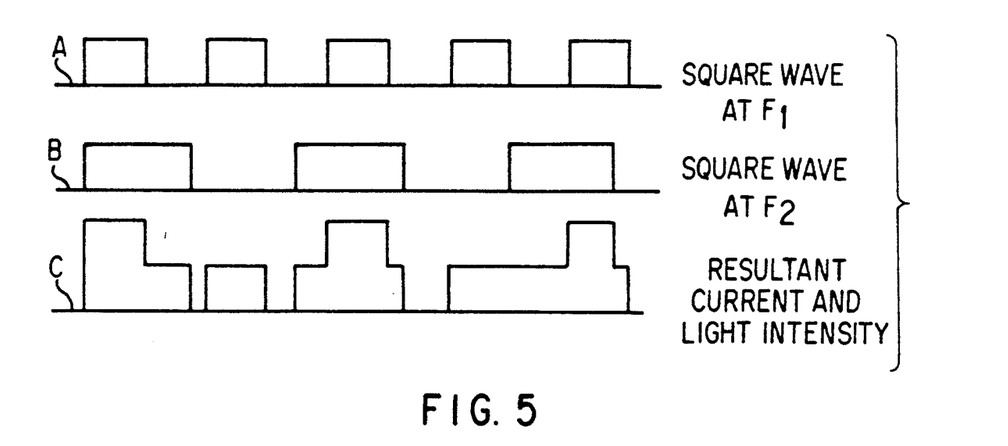
FIG. 5 graphically illustrates resultant current and radiation intensity output of the systems illustrated in FIGS. 3 and 4.

Square wave outputs of the driver 50 at frequencies $f_1$ and $f_2$ are represented by curves A and B of FIG. 5. The resultant current is represented in curve C of FIG. 5, which also represents the resultant radiation intensity emitted from source 48. The output response of laser diodes to applied current is non-linear. Accordingly, mixing of the applied currents at frequencies $f_1$ and $f_2$ can occur. It is important that the applied signals are carefully summed and then applied to the source 48. In order to assure that the driving current supplied by driver 50 maintains an appropriate form, for example, as depicted in curve C of FIG. 5, in this embodiment a correction signal must be generated. A correction signal is generated by a feedback loop that comprises a small mirror 52 positioned to receive radiation emitted by source 48 and reflected onto photocell 54. The output of photocell 54 is returned by a line 56 to the driver 50 to provide a correction or control signal. Continuous monitoring of the output of source 48 is desirable, because temperature variations can change the output response of a laser diode to applied signals. The feedback ensures that the light intensities are linearly summed.

The signal detection portion of the FIG. 4 embodiment is substantially the same as that described with respect to a FIG. 3 embodiment and like numbered elements are similarly numbered in FIG. 4.

Figure 6:
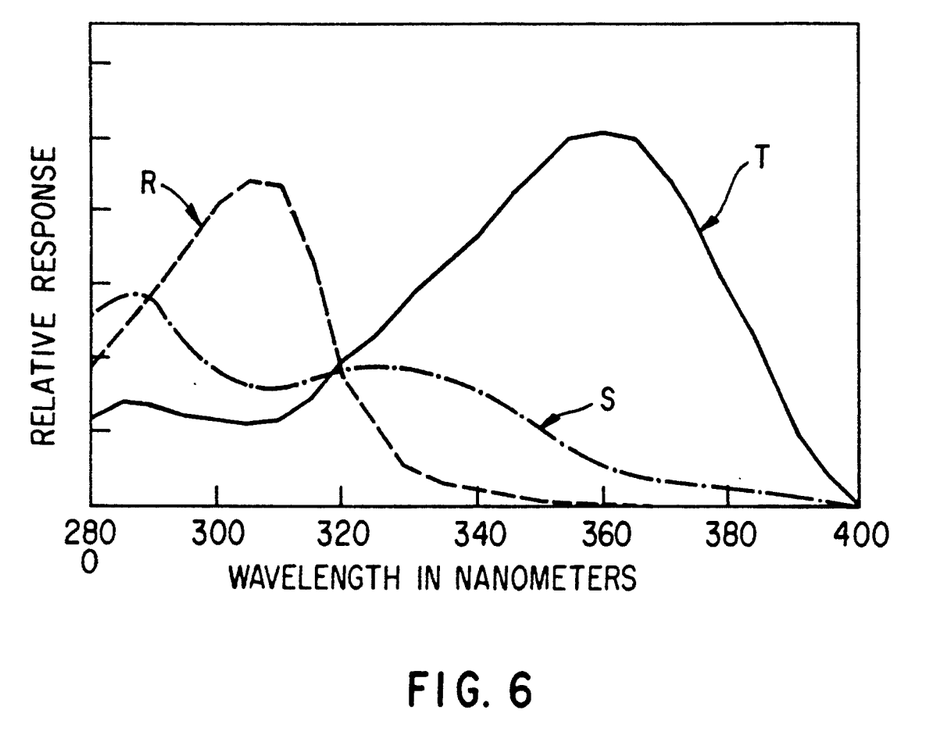
FIG. 6 shows the spectral absorption characteristics of three ultraviolet light absorbing compounds.
Figure 7:
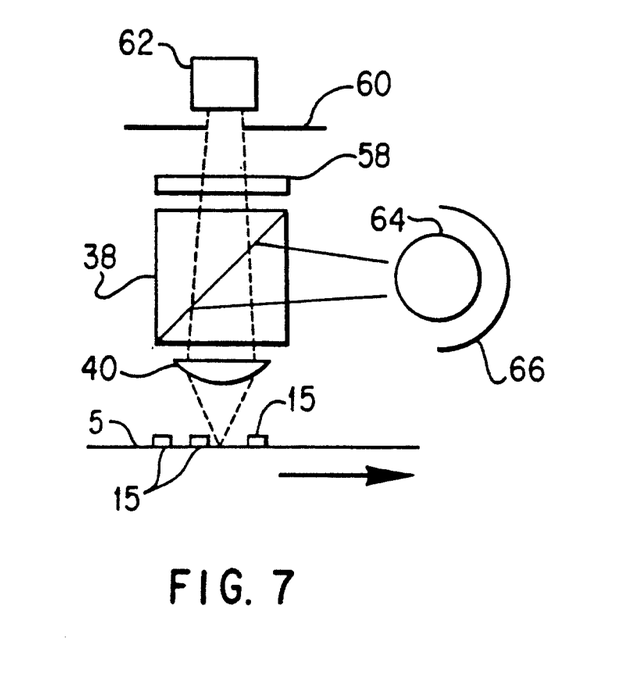
FIG. 7 is a schematic representation of another embodiment of a bar code reading apparatus.

FIGS. 6 and 7 illustrate aspects of another embodiment of the invention. As mentioned above, the detection of bar code information, particularly when invisibly coded, can become extremely difficult when the surface in which the bar code is printed contains compounds that fluoresce in the presence of radiation utilized for reading the bar code and where the bar code is printed on a portion of the surface that includes compounds, such as printing inks, that absorb fluorescent radiation from the elements of the bar code. Under such circumstances, the contrast ratio between the printed and unprinted portions of the bar code becomes extremely small resulting in a condition that the information signal is rendered indistinguishable by the noise of the system. In the arrangement shown in FIG. 7, the bars 15' of the bar code are formed of an ink that includes a dye that absorbs radiation provided by an irradiation source. Fluorescent compounds present in the surface on which the bar code is printed fluoresce as a result of incident radiation and that fluorescence is detected by an appropriate detector. With specific reference to FIG. 7, a radiation source 64, such as an ultraviolet lamp, directs with the aid of a reflector 66, ultraviolet radiation onto the half-silvered prism 38. The radiation from source 64 is directed by half-silvered prism 38, through convergent lens 40 onto the surface of a sheet S moving in the direction of the solid arrow D. The incident beam causes reflected radiation to issue from the surface of sheet 5, when the beam is, as shown in FIG. 7, incident on a portion of the surface at which the bars 15' are not present. The fluorescent radiation passes upwardly through the prism 38, through an appropriate filter 58 for filtering out ambient radiation, through a slit in slit plate 50, onto an ultraviolet sensitive photocell 62, the output of which is provided to a suitable signal processing circuit.

As previously mentioned, the ink forming the bars 15', includes a component or dye that absorbs radiation at ultraviolet wavelengths, for example, in the near ultraviolet range of 280 to 400 nanometers. Suitable UV absorbing dyes are known and are identified in the publication *Sunscreens* by Lowe, N. and Shaath, N. (Marcel Dekker, 1990). The reflectance response of three such dyes is illustrated in FIG. 6. The curve label R shows a response of an ultraviolet absorbing compound comprising an ester of 4-(dimethylamino) benzoic acid. Curve S represents the absorption characteristics of benzophenone-3, another UV absorbing compound useful on the present purpose. Curve T represents the absorption characteristics of another useful ultraviolet absorbent compound, butyl methoxydibenzomethane, sold under the tradename Parsol 1789 by the Givaudan Corporation. Other UV absorbent compounds useful for this purpose are benzophenone-4, benzophenone-8, ethyl dihydroxypropyl paba, glyceryl paba, menthyl anthrantilate, octocrylene, octyl salicylate, paba, 2-phenyl benzimidazole-5-sulphonic acid and etocrylene. These UV absorbing compounds are incorporated into inks used to form the bar code 14, for example, a thermojet ink. The compositions of suitable basic inks are known and no further description thereof is necessary. These compounds can be present in the ink in proportions ranging from about 0.1 to about 1% by weight.

The coding system illustrated in FIGS. 6 and 7 is for use primarily in reprographic machines, such as common office copiers, which use paper stocks employing UV fluorescent materials. Contrary to previous systems, instead of attempting to avoid the unwanted effects of fluorescence from whiteners and similar agents in paper, the system utilizes the presence of such whiteners to provide a significant contrast ratio. Inks utilizing UV absorbing compounds identified above typically will absorb from 1 to 10% of the incident radiation.

While the invention has been described with reference to the structures disclosed, it is not confined to the details set forth, but is intended to cover such modifications or changes as they come within the scope of the following claims.

What is claimed is:

1. A method for reading a fluorescent code on the surface of an article comprising the steps of:
   directing radiation toward the code to cause the code to fluoresce, the radiation being modulated at two frequencies, which frequencies are non-harmonically related; and
   detecting a radiation signal resulting from fluorescence of the code, which radiation signal is of a frequency that is one of a sum of the two frequencies and the difference of the two frequencies.

2. A method as in claim 1, wherein the radiation signal is in the infrared spectrum.

3. A method as in claim 2, wherein the radiation is sine wave modulated.

4. A method as in claim 2, wherein the radiation is square wave modulated.

5. Apparatus for reading bar codes formed of fluorescing marking material disposed on the surface of an article comprising:
   a radiation source for emitting a beam of radiation;
   modulating means for modulating the beam of radiation at two frequencies that are not harmonically related;
   means for irradiating the bar code with the modulated beam;
   detecting means for detecting a fluorescent radiation signal from the bar code at a frequency that is one of a sum of the two frequencies and a difference of the two frequencies.

6. Apparatus as in claim 5, wherein the fluorescent radiation signal detected by the detecting means is of an infrared wavelength.

7. Apparatus as in claim 5, wherein the radiation source comprises a first radiation emitting element, a first radiation modulating means for sinusoidally modulating radiation from the first radiation emitting element at one of said two frequencies, a second radiation emitting element and a second radiation modulating means for modulating radiation from the second radiation emitting element at a second of said two frequencies.

8. Apparatus as in claim 7, wherein the first and second radiation emitting elements are lasers.

9. Apparatus as in claim 5, wherein the modulating means comprises a first modulator for modulating the beam of radiation and a second modulator for modulating the beam of radiation.

10. Apparatus as in claim 9, wherein the first and second modulating means comprise electroacoustic modulators.

11. Apparatus as in claim 5, wherein the radiation source comprises a first radiation emitting element and a second radiation emitting element, a first modulator for square wave modulating the radiation from the first radiation emitting element at a first of the two frequencies; and a second modulator for square wave modulating the radiation from the second radiation emitting element at a second of the two frequencies.

12. Apparatus as in claim 11, wherein the first and second radiation emitting elements are one of lasers and light emitting diodes.

13. Apparatus as in claim 11, wherein the first and second modulators are square wave drivers for driving the first and second radiation emitting elements respectively.

14. Apparatus as in claim 12, wherein the first driver provides a pulse width different from the second driver.

15. Apparatus as in claim 5, wherein the radiation source comprises a single radiation emitting element, and the modulating means comprises a driving means for providing a first and a second square wave driving signal to the radiation emitting element, and further comprising a control means for controlling the driving means to emit radiation at an intensity that represents the linear sum of the first and second driving signals.

16. Apparatus as in claim 15, wherein the control means comprises a feedback loop including means for sensing the radiation emitted by the radiation emitting element and means for providing an electrical signal representative of the intensity of the emitted radiation to the modulating means.

17. Apparatus as in claim 15, wherein the light emitting element is one of a laser diode and a light emitting diode.

18. Apparatus as in claim 15, wherein the first driving signal has a pulse width different from the second driving signal.

19. A system for reading coded information disposed on a surface of an object, comprising:
   a radiation source for directing incident radiation toward the coded information on said surface;
   modulating means for modulating said incident radiation at a predetermined frequency;
   means for receiving radiation from the coded information, the received radiation emitted from the surface in response to impingement of said incident radiation on said surface; and
   detector means for selectively detecting emitted radiation, having a frequency related to said predetermined frequency, wherein the frequency component is an harmonic of said predetermined frequency.

20. A system for reading coded information disposed on a surface of an object, comprising:
   a radiation source for directing incident radiation toward the coded information on said surface;
   modulating means for modulating said incident radiation at a predetermined frequency;
   means for receiving radiation from the coded information, the receivid radiation emitted from the surface in response to impingement of said incident radiation on said surface; and
   detector means for selectively detecting emitted radiation, having a frequency component related to said predetermined frequency, wherein the coded information is a pattern formed of a marking material disposed on said surface, said marking material including a dye for absorbing said incident radiation and emitting said emitted radiation in response thereto.

21. A system as in claim 20, wherein the dye comprises a material having a non-linear response to said absorbed radiation.

22. A system as in claim 21, wherein the incident and emitted radiation are at infrared wavelengths.

23. A system for reading coded information disposed on a surface of an object, comprising:
   a radiation source for directing incident radiation toward the coded information on said surface;
   modulating means for modulating said incident radiation at a predetermined frequency;

means for receiving radiation from the coded information, the received radiation emitted from the surface in response to impingement of said incident radiation on said surface; and detector means for selectively detecting emitted radiation, having a frequency component related to said predetermined frequency, wherein the modulating means further comprises means for modulating the incident radiation at a second frequency non-harmonically related to the predetermined frequency and wherein the detector means is responsive to radiation that is modulated at one of a sum and a difference of the predetermined frequency and the second frequency.

24. A system as in claim 23, wherein the modulating means comprises means for sinusoidally modulating the incident radiation.

25. A system as in claim 23, wherein the modulating means comprises means for imparting square wave modulation to the incident radiation.

26. A method for reading coded information disposed on a surface, comprising the steps of:
  directing incident radiation toward the coded information on the surface;
  modulating said incident radiation at a predetermined frequency;
  receiving radiation emitted from the coded information on the surface in response to incident radiation; and
  selectively detecting a component of the received radiation at a frequency related to said predetermined frequency, wherein the component of the received radiation is modulated at a frequency which is a harmonic of the predetermined frequency.

27. A method for reading coded information disposed on a surface, comprising the steps of:
  directing incident radiation toward the coded information on the surface;
  modulating said incident radiation at a predetermined frequency;
  receiving radiation emitted from the coded information on the surface in response to incident radiation; and
  selectively detecting a component of the received radiation at a frequency related to said predetermined frequency, wherein the step of modulating said incident radiation further comprises modulating the incident radiation at a second frequency non-harmonically related to the predetermined frequency and the step of detecting the component of the emitted radiation comprises detecting one of a sum component and a difference component of the predetermined frequency and the second frequency.

28. A method as in claim 27, wherein the step of modulating the incident radiation comprises sinusoidal modulation.

29. A method as in claim 27, wherein the step of modulating the incident radiation comprises square wave modulation.

30. A reader for sensing coded information applied to a surface comprising:
  a source of radiation for emitting a beam of radiation;
  an optical deflector for receiving said beam in one direction and deflecting the beam of radiation toward the surface in a second direction transverse to the first direction;
  a detecting element positioned to receive radiation from the surface, the radiation from the surface passing through the optical deflector to the detecting element.

31. A reader as in claim 30, wherein the path of radiation from the surface is substantially parallel to said second direction.

32. A reader as in claim 30, wherein the optical deflector is a half-silvered prism.

33. A reader as in claim 30, and further comprising means defining a sheet feed path for moving sheets to be scanned relative to the optical deflector.

* * * * *